United States Patent
Yoon et al.

(10) Patent No.: US 11,847,017 B2
(45) Date of Patent: Dec. 19, 2023

(54) METHOD FOR DETERMINING A RESET CAUSE OF AN EMBEDDED CONTROLLER FOR A VEHICLE AND AN EMBEDDED CONTROLLER FOR A VEHICLE TO WHICH THE METHOD IS APPLIED

(71) Applicants: HYUNDAI MOTOR COMPANY, Seoul (KR); KIA CORPORATION, Seoul (KR); IUCF-HYU (Industry-University Cooperation Foundation Hanyang University), Seoul (KR)

(72) Inventors: Hyunmin Yoon, Suwon-si (KR); Minsoo Ryu, Seoul (KR); Seokyong Jung, Seoul (KR); Jaehyun Bae, Seoul (KR); Jaehyung Choi, Seoul (KR)

(73) Assignees: HYUNDAI MOTOR COMPANY, Seoul (KR); KIA CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 17/874,608

(22) Filed: Jul. 27, 2022

(65) Prior Publication Data

US 2023/0185654 A1 Jun. 15, 2023

(30) Foreign Application Priority Data

Dec. 13, 2021 (KR) .......................... 10-2021-0178080

(51) Int. Cl.
*G06F 11/07* (2006.01)
*G06F 13/28* (2006.01)

(52) U.S. Cl.
CPC ........ *G06F 11/079* (2013.01); *G06F 11/0739* (2013.01); *G06F 13/28* (2013.01); *G06F 2213/28* (2013.01)

(58) Field of Classification Search
CPC ............... G06F 11/079; G06F 11/0739; G06F 11/0766; G06F 11/0721; G07C 5/0808
See application file for complete search history.

(56) References Cited

U.S. PATENT DOCUMENTS

| 8,589,889 B2 | 11/2013 | Kim et al. |
| 10,545,850 B1 * | 1/2020 | Iyer ....................... G06F 11/302 |

(Continued)

FOREIGN PATENT DOCUMENTS

| KR | 100868762 B1 | 11/2008 |
| KR | 101018080 B1 | 3/2011 |
| KR | 101584783 B1 | 1/2016 |

*Primary Examiner* — Yolanda L Wilson
(74) *Attorney, Agent, or Firm* — LEMPIA SUMMERFIELD KATZ LLC

(57) ABSTRACT

A method for determining a reset cause of an embedded controller for a vehicle includes: executing an embedded controller for the vehicle by a central processing unit (CPU) of the embedded controller; generating a log based on information related to reset of the embedded controller collected from the running embedded controller, and a sequence number generated by the running embedded controller by the embedded controller; determining cause information of a reset trigger by analyzing the log including the reset trigger log, and determining reset cause information of the embedded controller based on the cause information of the reset trigger by a log analyzer of the embedded controller; storing a cause analysis result log including the reset cause information in a cause analysis result buffer in response to the reset cause information by the embedded controller; and storing the cause analysis result log in a non-volatile storage device.

11 Claims, 5 Drawing Sheets

(56) References Cited

U.S. PATENT DOCUMENTS

| | | | |
|---|---|---|---|
| 2008/0282229 A1 | 11/2008 | Kim et al. | |
| 2009/0153290 A1* | 6/2009 | Bierach | H04L 9/32 |
| | | | 340/5.6 |
| 2015/0113334 A1* | 4/2015 | Raj | G06F 11/079 |
| | | | 714/45 |
| 2015/0278001 A1* | 10/2015 | Tohyama | G06F 1/24 |
| | | | 714/37 |
| 2016/0132378 A1* | 5/2016 | Jung | G06F 11/0757 |
| | | | 714/55 |
| 2018/0081762 A1* | 3/2018 | Inoue | G05B 23/0259 |
| 2018/0257663 A1* | 9/2018 | Jiang | G06F 11/3452 |
| 2019/0272218 A1* | 9/2019 | Takai | G06F 9/542 |
| 2023/0032305 A1* | 2/2023 | Krishnani | G06F 11/0793 |
| 2023/0073830 A1* | 3/2023 | Jauss | G06F 11/3082 |

\* cited by examiner

FIG. 3

Schedular log

| Sequence number | Task ID | Return Address information of call stack |

Interrupt log

| Sequence number | Interrupt priority | Return Address information of call stack |

Critical section log

| Sequence number | Spinlock ID | Spinlock acquisition state | Return Address information of call stack |

Trap log

| Sequence number | Trap ID | Register value indicating information related to trap | Return Address information of call stack |

Watchdog log

| Sequence number | Watchdog ID | Watchdog setting information | Return Address information of call stack |

Interrupt disabling log

| Sequence number | Interrupt disabling information | Return Address information of call stack |

Reset trigger log

| Sequence number | Reset trigger information | Return Address information of call stack |

PC log

| Sequence number | PC register value |

SP log

| Sequence number | SP register value |

FIG. 4

SW reset log
| Sequence number | SW reset request information | Value requesting SW reset | Return Address information of call stack |

Watchdog error log
| Sequence number | Watchdog error information | Return Address information of call stack |

Safety mechanism violation log
| Sequence number | Safety mechanism violation information |

FIG. 5

Cause analysis result log

| Sequence number | Reset trigger | Reset trigger cause | Reset cause |
|---|---|---|---|

METHOD FOR DETERMINING A RESET CAUSE OF AN EMBEDDED CONTROLLER FOR A VEHICLE AND AN EMBEDDED CONTROLLER FOR A VEHICLE TO WHICH THE METHOD IS APPLIED

CROSS-REFERENCE TO RELATED APPLICATION

This application claims priority to and the benefit of Korean Patent Application No. 10-2021-0178080, filed in the Korean Intellectual Property Office on Dec. 13, 2021, the entire contents of which are incorporated herein by reference.

BACKGROUND

(a) Field of the Disclosure

The present disclosure relates to a vehicle. More particularly, the present disclosure relates to a method for determining a reset cause of an embedded controller for a vehicle and relates to an embedded controller for a vehicle to which the method is applied.

(b) Description of the Related Art

In general, an embedded system (e.g., an electronic control unit (ECU), which is a system embedded in a vehicle) refers to a system in which software (firmware) that operates the system is embedded in hardware to perform only special functions. Unlike a general computer, it performs only predefined tasks. In other words, the embedded system refers to a device that performs only the functions specified by an original manufacturer by embedding a microprocessor or microcontroller and refers to a specific application system including hardware and software for performing special tasks.

Unlike a personal computer that has an operating system that is built-in in a large capacity storage device such as a hard disk, an embedded system is a system in which an operating system and application programs with real-time processing performance are driven using limited resources.

Features of such an embedded system include that it can process a specific function at a very high speed compared to a general computer.

The above information disclosed in this Background section is only for enhancement of understanding of the background of the present disclosure, and therefore it may contain information that does not form the prior art that is already known to a person of ordinary skill in the art.

SUMMARY

The present disclosure provides a method for determining a cause of reset of an embedded controller for a vehicle that can determine a reset cause of the controller by collecting a log (or log file) during the runtime (or execution time) of the embedded controller for the vehicle. The present disclosure also provides an embedded controller for a vehicle to which the method is applied.

In one embodiment of the present disclosure, a method for determining a reset cause of an embedded controller for a vehicle includes: executing an embedded controller for the vehicle by a central processing unit (CPU) of the embedded controller for a vehicle. The method also includes generating a log based on information related to reset of the embedded controller for a vehicle collected from the running embedded controller for the vehicle, and a sequence number generated by the running embedded controller for vehicle by the embedded controller for the vehicle. The method also includes determining cause information of a reset trigger by analyzing the log including the reset trigger log and determining reset cause information of the embedded controller for the vehicle based on the cause information of the reset trigger by a log analyzer of the embedded controller for a vehicle. The method also includes storing a cause analysis result log including the reset cause information in a cause analysis result buffer in response to the reset cause information by the embedded controller for a vehicle. The method also includes storing the cause analysis result log in a non-volatile storage device by the log recorder.

The generating the log may include generating, by the log collector of the running embedded controller for the vehicle, a first log included in the log based on the information related to the reset of the embedded controller for a vehicle collected from the CPU of the running embedded controller for the vehicle, and the sequence number generated by the sequence number generator of the running embedded controller for the vehicle. The generating the log may also include generating a second log related to the reset of the embedded controller for the vehicle and including the log based on the sequence number generated by the sequence number generator by a direct memory access (DMA) of the running embedded controller for the vehicle.

The first log may include a log including scheduler information related to a process task of an operating system of the embedded controller for the vehicle.

The second log may include a log including a register value collected by the DMA controller and stored in a program counter, and the second log may also include a log including a register value collected by the DMA controller and stored at a stack pointer.

The cause information of the reset trigger and the reset cause information may be already stored in a global buffer of the log analyzer.

The non-volatile storage device may include an electrically erasable programmable read-only memory (EEPROM).

In order to solve the problem, an embedded controller for a vehicle according to an embodiment of the present disclosure includes a sequence number generator that generates a sequence number. The embedded controller also includes a log collector that generates a first log based on information related to reset of the embedded controller for the vehicle and collected from a central processing unit (CPU) of the running embedded controller for the vehicle, and the sequence number. The embedded controller also includes a direct memory access (DMA) controller that generates a second log related to reset of the embedded controller for the vehicle based on the sequence number. The embedded controller also includes a log analyzer that determines cause information of a reset trigger by analyzing the first log including a reset trigger log and a second log and determines reset cause information of the embedded controller for the vehicle based on cause information of the reset trigger. The embedded controller also includes a log recorder that stores a cause analysis result log including the reset cause information in a cause analysis result buffer in response to the reset cause information and stores the cause analysis result log in a non-volatile storage device.

The first log may include a log including scheduler information related to a process task of an operating system of the embedded controller for the vehicle.

The second log may include a log including a register value collected by the DMA controller and stored in a program counter, and a log including a register value collected by the DMA controller and stored at a stack pointer.

The cause information of the reset trigger and the reset cause information may be already stored in a global buffer of the log analyzer.

The non-volatile storage device may include an electrically erasable programmable read-only memory (EEPROM).

The method for determining the cause of reset of the embedded controller for the vehicle according to the above-described an embodiment of the present disclosure and the embedded controller for the vehicle to which the method is applied can determine the cause of the reset of the controller by collecting logs during the runtime of the embedded controller for the vehicle.

BRIEF DESCRIPTION OF THE DRAWINGS

In order that the disclosure may be well understood, there will now be described various forms thereof, given by way of example, reference being made to the accompanying drawings, in which:

FIG. 3 is provided for description of a structure of a log stored in a CPU buffer shown in FIG. 2;

FIG. 4 is provided for description of a structure of a log stored in a global buffer in one embodiment of the present disclosure; and FIG. 5 is provided for description of a structure of a log stored in a cause analysis result buffer shown in FIG. 2.

Figure 1:
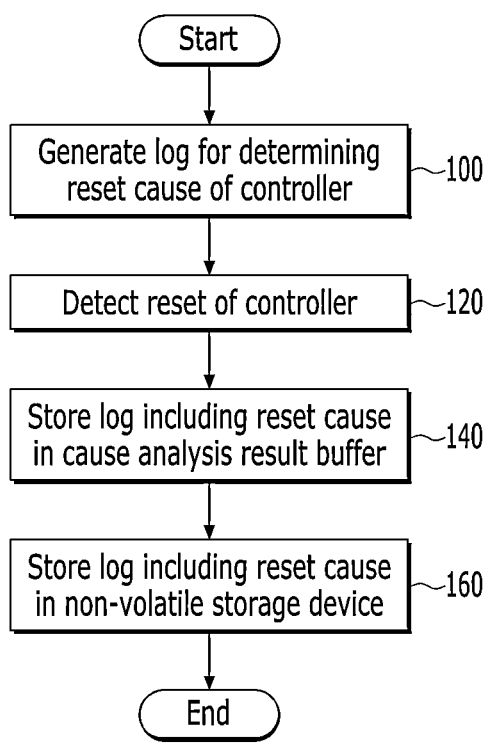
FIG. 1 is a flowchart illustrating a reset cause determination method of an embedded controller for a vehicle according to an embodiment of the present disclosure.

The drawings described herein are for illustration purposes only and are not intended to limit the scope of the present disclosure in any way.

DETAILED DESCRIPTION

In order to fully understand the present disclosure and the object achieved by the practice of the present disclosure, reference should be made to the accompanying drawings illustrating an embodiment of the present disclosure.

Hereinafter, the present disclosure is described in detail by describing an embodiment of the present disclosure with reference to the accompanying drawings. In description of the present disclosure, when it is determined that a detailed description of a related known configuration or function may obscure the gist of the present disclosure, the detailed description has been omitted. The same reference signs presented in each drawing may indicate the same or equivalent constituent elements.

The terminology used in the present specification is only used to describe a specific embodiment and is not intended to limit the present disclosure. Expressions in the singular include expressions of the plural unless the context clearly dictates otherwise. In the present specification, terms such as "include" or "comprise" are intended to designate the existence of a feature, number, step, action, constituent element, part, or combinations thereof described in the specification, and it should be understood that they do not preclude the possibility of the existence or addition of one or more other features, numbers, steps, actions, constituent elements, parts, or combinations thereof.

Throughout this specification and the claims that follow, when it is described that an element is "coupled" to another element, this includes not only the case of "directly connected" but also the case of "electrically or mechanically connected" with other constituent elements in between.

Unless defined otherwise, terms used herein, including technical or scientific terms, have the same meaning as commonly understood by a person of ordinary skill in the art to which the present disclosure belongs. Terms such as those defined in the generally-used dictionary should be interpreted as having a meaning consistent with the meaning in the context of the related technology. Unless explicitly defined in the present specification, they are not to be interpreted in an idealized or excessively formal meaning. When a component, device, element, or the like of the present disclosure is described as having a purpose or performing an operation, function, or the like, the component, device, or element should be considered herein as being "configured to" meet that purpose or to perform that operation or function.

An unexpected reset phenomenon of an embedded controller for a vehicle is a problem that threatens safety and performance of the vehicle. However, since a reset generally initializes controller hardware (HW), which is a controller, and software (SW) included in the controller, it is difficult to find clues as to why, even though a memory area of the controller that is not initialized is used, it is difficult to select information that is needed to analyze the cause of a reset that occurs due to various reasons.

In the technology for debugging according to the related technology, additional cost may be incurred because the information recorded for debugging is insufficient to analyze the cause of reset, or separate hardware is implemented to record information for debugging.

Figure 2:
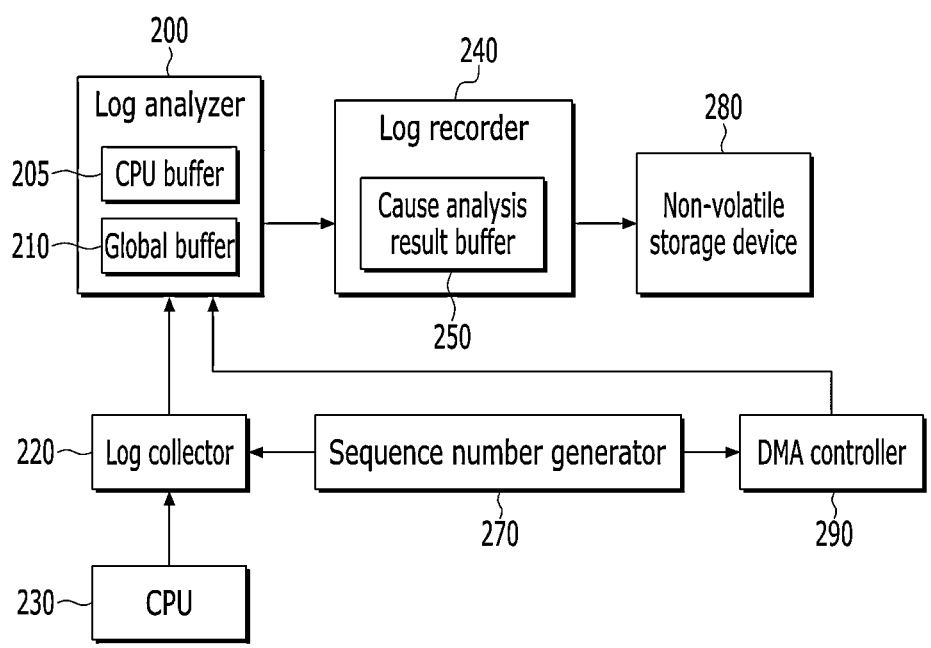
FIG. 2 is a block diagram depicting the embedded controller for vehicle to which the reset cause determination method shown in FIG. 1 applies.

FIG. 1 is a flowchart illustrating a reset cause determination method of an embedded controller for a vehicle according to an embodiment of the present disclosure. FIG. 2 is a schematical block diagram illustrating the embedded controller for vehicle to which the reset cause determination method shown in FIG. 1 applies in another embodiment of the present disclosure. FIG. 3 depicts a structure of a log stored in a CPU buffer shown in FIG. 2. FIG. 4 illustrates a structure of a log stored in a global buffer. FIG. 5 describes a structure of a log stored in a cause analysis result buffer shown in FIG. 2.

Referring to FIG. 1-FIG. 5, in generation 100, a log collector 220 of an embedded controller for a vehicle may generate a first log based on information related to reset of the embedded controller for a vehicle, collected from a central processing unit (CPU) 230, and a sequence number generated by a sequence number generator 270 of the running embedded controller for a vehicle. A direct memory access (DMA) controller 290 of the running embedded controller for a vehicle may generate a second log related to the reset of the embedded controller for a vehicle based on the sequence number generated by the sequence number generator 270. The CPU 230 may execute the embedded controller for a vehicle. The DMA controller 290 does not use resources of the CPU 230. The sequence number may indicate the generation order of the first log and the generation order of the second log.

For example, the first log may include a log including scheduler information about a processing task of an operating system (OS), which is software of the controller; a log including interrupt information about the priority of the interrupt of the controller's OS; a log including critical section information about synchronization tools such as a spinlock; a log including information about a trap (or a condition delivery point) of the OS of the controller; a log including information about input/output (I/O) functions of the OS of the controller; a log including information about a safety mechanism, which is a rule of the controller that causes a reset to occur in case of violation; a log including information about a watchdog timer that detects a CPU failure; a log including information about a register in which reset trigger information that has occurred after the controller reset is stored; a log including information about the register in which interrupt disabling information is stored; or a log including information about software (SW) reset of the controller after controller reset (e.g., cause of software (SW) reset).

For example, the second log may include a log including a register value collected by the DMA controller and stored in a program counter PC and may include a log including a register value collected by the DMA controller and stored at a stack pointer SP. For example, a program counter and a stack pointer may be included in the CPU 230.

The first log and the second log illustrated in FIG. 3 may be stored in a CPU buffer 205 of a log analyzer 200.

The embedded controller for a vehicle such as a microprocessor includes a log analyzer 200 including a CPU buffer 205 and a global buffer 210; a log collector 220; a CPU 230; a log recorder 240 including a cause analysis result buffer 250; a sequence number generator 270; a non-volatile storage device 280 such as an electrically erasable programmable read-only memory (EEPROM); and a direct memory access (DMA) controller 290.

The CPU 230 such as a microprocessor may control the entire operation of the embedded controller for a vehicle that controls the operation of the vehicle. The CPU 230 may be operated by a program (i.e., a control logic), and the program is a series of instructions for performing a reset cause determination method of the embedded controller for a vehicle according to the embodiment of the present disclosure. The instruction may be stored in the memory of the embedded controller for vehicle.

According to step 120, the CPU 230 may detect that the embedded controller for vehicle is reset.

According to step 140, the log analyzer 200 determines the cause information of a reset trigger by analyzing the first log including the reset trigger log related to the reset of the detected embedded controller for a vehicle and by analyzing the second log. The log analyzer 200 also determines the reset cause information of the embedded controller for a vehicle based on the cause information of the reset trigger. The log including the cause information of the reset trigger, and the reset cause information shown in FIG. 4, may have already been stored in the global buffer 210. The log recorder 240 includes reset cause information in response to the reset cause information, and the log recorder 240 may store the cause analysis result log shown in FIG. 5 in the cause analysis result buffer 250.

For example, the reset trigger may include a software (SW) reset trigger (or an application reset trigger), a warm power-on reset trigger, or a cold power-on reset trigger.

For example, the cause information of the reset trigger may include watchdog error information related to a watchdog timer corresponding to a software reset trigger, safety mechanism violation information corresponding to the reset trigger, or software reset request information corresponding to the software reset trigger.

The cause information of the reset trigger may further include external health check failure information related to execution monitoring of the controller and may further include power supply failure information related to power supplied to the controller by a regulator corresponding to the warm power-on reset trigger and the cold power-on reset trigger.

For example, the reset cause information may include timing violation (e.g., task deadline miss of the OS) corresponding to the software reset request information; invalid data (e.g., an inappropriate condition value) corresponding to the software reset request information; stack overflow (e.g., stack overflow of the OS) corresponding to the software reset request information, access violation (e.g., an attempt to access an inaccessible area of memory) corresponding to the software reset request information; a semantic violation corresponding to the watchdog error information and the safety mechanism violation information; or unstable power supply corresponding to the power supply failure information (e.g., oversupplied power to the controller or insufficient power to operate the controller).

According to step 160, the log recorder 240 may store (or record) the cause analysis result log stored in the cause analysis result buffer 250 in the non-volatile storage device 280. For example, the cause analysis result log stored in the non-volatile storage device 280 may be displayed to a developer of the embedded controller for a vehicle through the display device.

The constituent elements or "-unit" or "-group" or a block or module used in the embodiment of the present disclosure can be implemented as tasks, classes, subroutines, processes, objects, execution threads, software such as a program, or hardware such as a field-programmable gate array (FPGA) or an application-specific integrated circuit (ASIC), or a combination of the software and hardware. The constituent elements or "-unit" may be included in a computer-readable storage medium, or a part thereof may be dispersed and distributed in a plurality of computers.

As above, the embodiment was disclosed in drawings and the specification. Here, although specific terms have been used, these are only used for the purpose of describing the present disclosure and are not to be used to limit the meaning or range of the present disclosure described in the claims range. Therefore, a person of ordinary skill in this technical field should be able to understand that numerous variations and equivalent embodiments are possible from the present disclosure. Therefore, the true technical protection range of the present disclosure should be determined by the technical idea of the appended claims range.

DESCRIPTION OF SYMBOLS

200: log analyzer
205: CPU buffer
210: global buffer
220: log collector
230: CPU
240: log recorder
250: cause analysis result buffer
270: sequence number generator
280: non-volatile storage device
290: DMA controller

What is claimed is:
1. A method for determining a reset cause of an embedded controller for a vehicle, the method comprising:

executing an embedded controller for the vehicle by a central processing unit (CPU) of the embedded controller for a vehicle;

generating a log based on information related to reset of the embedded controller collected from the running embedded controller for the vehicle, and a sequence number generated by the running embedded controller by the embedded controller;

determining cause information of a reset trigger by analyzing the log including a reset trigger log, and determining reset cause information of the embedded controller for the vehicle based on the cause information of the reset trigger by a log analyzer of the embedded controller;

storing a cause analysis result log including the reset cause information in a cause analysis result buffer in response to the reset cause information by the embedded controller; and storing the cause analysis result log in a non-volatile storage device by the log recorder.

2. The method of claim 1, wherein the generating the log comprises:

generating a first log included in the log based on the information related to the reset of the embedded controller collected from the CPU of the running embedded controller, and the sequence number generated by the sequence number generator of the running embedded controller by the log collector of the running embedded controller; and generating a second log related to the reset of the embedded controller and including the log based on the sequence number generated by the sequence number generator by a direct memory access (DMA) of the running embedded controller.

3. The method of claim 2, wherein
the first log includes a log including scheduler information related to a process task of an operating system of the embedded controller.

4. The method of claim 2, wherein
the second log includes a log including a register value collected by the DMA controller and stored in a program counter, and a log including a register value collected by the DMA controller and stored at a stack pointer.

5. The method of claim 1, wherein
the cause information of the reset trigger and the reset cause information are already stored in a global buffer of the log analyzer.

6. The method of claim 1, wherein
the non-volatile storage device comprises an electrically erasable programmable read-only memory (EEPROM).

7. An embedded controller for a vehicle, comprising:

a sequence number generator configured to generate a sequence number;

a log collector configured to generate a first log based on information related to reset of the embedded controller for the vehicle and collected from a central processing unit (CPU) of the running embedded controller, and the sequence number;

a direct memory access (DMA) controller configured to generate a second log related to reset of the embedded controller based on the sequence number;

a log analyzer configured to: determine cause information of a reset trigger by analyzing the first log including a reset trigger log and a second log, and determine reset cause information of the embedded controller based on cause information of the reset trigger; and a log recorder configured to: store a cause analysis result log including the reset cause information in a cause analysis result buffer in response to the reset cause information, and store the cause analysis result log in a non-volatile storage device.

8. The embedded controller of claim 7, wherein
the first log includes a log including scheduler information related to a process task of an operating system of the embedded controller.

9. The embedded controller of claim 7, wherein
the second log includes a log including a register value collected by the DMA controller and stored in a program counter, and a log including a register value collected by the DMA controller and stored at a stack pointer.

10. The embedded controller of claim 7, wherein
the cause information of the reset trigger and the reset cause information are already stored in a global buffer of the log analyzer.

11. The embedded controller of claim 7, wherein
the non-volatile storage device comprises an electrically erasable programmable read-only memory (EEPROM).

* * * * *